US012051354B2

(12) United States Patent
Wang et al.

(10) Patent No.: US 12,051,354 B2
(45) Date of Patent: Jul. 30, 2024

(54) DRIVING METHOD AND DISPLAY DEVICE

(71) Applicant: HKC CORPORATION LIMITED, Shenzhen (CN)

(72) Inventors: Mingliang Wang, Chongqing (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/241,983

(22) Filed: Sep. 4, 2023

(65) Prior Publication Data

US 2023/0410713 A1 Dec. 21, 2023

Related U.S. Application Data

(62) Division of application No. 17/847,202, filed on Jun. 23, 2022, now Pat. No. 11,776,450.

(30) Foreign Application Priority Data

Jun. 23, 2021 (CN) ......................... 202110698393.8

(51) Int. Cl.

| | |
|---|---|
| ***G09G 3/20*** | (2006.01) |
| ***G09G 3/00*** | (2006.01) |
| ***G09G 3/36*** | (2006.01) |

(52) U.S. Cl.

CPC ........... *G09G 3/2007* (2013.01); *G09G 3/006* (2013.01); *G09G 3/3696* (2013.01);
(Continued)

(58) Field of Classification Search

CPC .... G09G 3/2007; G09G 3/006; G09G 3/3696; G09G 2320/0233; G09G 2320/0247;
(Continued)

(56) References Cited

U.S. PATENT DOCUMENTS

| | | | | |
|---|---|---|---|---|
| 2006/0152462 A1* | 7/2006 | Furihata ............... | G09G 3/3655 345/98 |
| 2007/0057975 A1* | 3/2007 | Oh ....................... | G09G 3/3648 345/690 |

(Continued)

FOREIGN PATENT DOCUMENTS

| | | |
|---|---|---|
| CN | 104536177 A | 4/2015 |
| CN | 109036255 A | 12/2018 |

(Continued)

*Primary Examiner* — Jose R Soto Lopez

(57) ABSTRACT

A driving method and a display device are disclosed. The driving method drives the display panel according to a common voltage look-up table, and the common voltage look-up table is generated by a method including: driving a preset area for display with a preset area gray-scale value; shooting the preset area and obtaining a brightness and a flicker value corresponding to the preset area; adjusting the common voltage value multiple times, and recording the common voltage value when the corresponding flicker value is the minimum as the optimal common voltage value; adjusting the preset area gray-scale value multiple times, and recording a plurality of optimal common voltage values corresponding to the adjusted preset area gray-scale values; and generating the common voltage look-up table according to the multiple preset area gray-scale values and the corresponding optimal common voltage values.

12 Claims, 4 Drawing Sheets

(52) U.S. Cl.
CPC ............... *G09G 2320/0233* (2013.01); *G09G 2320/0247* (2013.01); *G09G 2330/12* (2013.01)

(58) Field of Classification Search
CPC ............. G09G 2330/12; G09G 3/3655; G09G 2320/0276; G09G 3/20; G09G 3/36
See application file for complete search history.

(56) References Cited

U.S. PATENT DOCUMENTS

| | | | | |
|---|---|---|---|---|
| 2010/0033414 | A1* | 2/2010 | Jeong | G09G 3/3655 345/89 |
| 2013/0201205 | A1* | 8/2013 | Jung | G09G 3/3648 345/596 |
| 2015/0103108 | A1* | 4/2015 | Seong | G09G 3/3208 345/694 |
| 2015/0213769 | A1* | 7/2015 | Shin | G09G 3/3655 345/89 |
| 2018/0374438 | A1* | 12/2018 | Cao | G09G 3/3614 |
| 2019/0080663 | A1* | 3/2019 | Liu | G09G 3/3655 |

FOREIGN PATENT DOCUMENTS

| | | | |
|---|---|---|---|
| CN | 109671404 | A | 4/2019 |
| CN | 111816137 | A | 10/2020 |

* cited by examiner

DRIVING METHOD AND DISPLAY DEVICE

CROSS-REFERENCE TO RELATED APPLICATIONS

This application is a division of U.S. patent application Ser. No. 17/847,202 filed Jun. 23, 2022, which is hereby incorporated by reference herein in its entirety.

TECHNICAL FIELD

This application relates to the field of display technology, and more particularly relates to a driving method and a display device.

BACKGROUND

The statements herein are intended for the mere purpose of providing background information related to the present application and do not necessarily constitute prior art.

In the current large-size panel drive architecture, the driver board has a timing control chip responsible for providing timing signals, and a gamma chip responsible for providing a gamma voltage and a common voltage. As the LCD TV develops in the trend of large size and high resolution, the charging times of the liquid crystal panel are getting shorter and shorter, and the charging difference between the pixels corresponding to the far and near ends of the driver chip is also increasing, such that the actual display effects also have obvious differences.

Since the human eye tends to focus on the central area of the panel, in calibration the central area is often calibrated to be the best state, but other areas are often not in the best state due to the difference in charging, which can cause flickering or uneven brightness in other areas.

SUMMARY

It is therefore a purpose of the present application to provide a driving method and a display device, which can achieve uniform charging of the entire display panel under different images by changing the common voltage value.

The present application discloses a driving method for driving a display panel according to a common voltage look-up table, the driving method including the following operations:

obtaining an area gray-scale value of a preset area of the display panel;

obtaining an optimal common voltage value corresponding to the area gray-scale value from the common voltage look-up table corresponding to the preset area, and outputting it to the common electrode of the preset area to drive the display panel for display;

wherein the method for generating the common voltage look-up table includes the following operations:

driving the preset area for display with the preset area gray-scale value;

shooting the preset area to obtain a flicker value corresponding to the preset area;

adjusting the common voltage value a number of times, and recording the common voltage value with the smallest flicker value as the optimal common voltage value;

adjusting the preset area gray-scale value a number of times, and recording a plurality of optimal common voltage values corresponding to the plurality of adjusted preset area gray-scale values; and generating the common voltage look-up table according to the plurality of preset area gray-scale values and corresponding optimal common voltage values.

Optionally, there are at least two preset areas, and each of the preset areas corresponds to a common voltage look-up table. The common voltage look-up table corresponding to at least one of the preset regions is different from the common voltage look-up tables corresponding to other preset areas. At least one same preset gray-scale value in different common voltage look-up tables correspond to different optimal common voltage values.

Optionally, the method further includes the following operations after the operation of generating a common voltage look-up table according to a plurality of preset area gray-scale values and the corresponding optimal common voltage values:

writing the common voltage look-up table into a memory of the timing control chip;

performing a re-power-on test, using the optimal common voltage values of the common voltage look-up table corresponding to the preset area to drive the display panel for display, re-obtaining the flicker values and determine whether they meets the preset requirements; if they meet the preset requirements, deciding that the common voltage look-up table is qualified; otherwise if they don't meet the preset requirements, re-testing and generating a new common voltage look-up table, and writing the new common voltage look-up table and re-testing it until it is qualified.

Optionally, the display panel is equally divided into 9 preset areas.

The operation of obtaining the area gray-scale value of the preset area of the display panel includes:

obtaining the area gray-scale value of each of the 9 preset areas;

The operation of obtaining the common voltage value corresponding to the area gray-scale value from the common voltage look-up table corresponding to the preset area and outputting it to the common electrode of the preset area to drive the display panel for display includes:

obtaining the optimal common voltage values corresponding to the area gray-scale values in the 9 preset areas from the common voltage look-up tables corresponding to the 9 preset areas, respectively, and outputting them to the common electrodes of the 9 preset areas to drive the 9 preset areas of the display panel for display.

Optionally, the preset area includes a center area and a peripheral area;

The operation of obtaining the area gray-scale value of the preset area of the display panel includes:

obtaining the area gray-scale values of the center area and the peripheral area respectively;

The operation of obtaining the common voltage value corresponding to the area gray-scale value from the common voltage look-up table corresponding to the preset area and outputting it to the common electrode of the preset area to drive the display panel for display includes:

obtaining the optimal common voltage values corresponding to the gray-scale values of the center area and the peripheral area respectively from the common voltage look-up tables corresponding to the center area and the peripheral area, and outputting the obtained optimal common voltages to the common electrodes of the center area and the peripheral area respectively to drive the middle area and the peripheral area of the display panel for display;

wherein the peripheral area is arranged around the center area, and the area ratio of the center area to the peripheral area is 2:1 to 1:1.

The common voltage look-up table corresponding to the center area is a first common voltage look-up table, and the common voltage look-up table corresponding to the peripheral area is a second common voltage look-up table. A set of a preset gray-scale value and an optimal common voltage value in the common voltage look-up table constitute a data group, and the number of data groups in the first common voltage look-up table is greater than the number of data groups in the second common voltage look-up table.

Optionally, the operation of obtaining the area gray-scale value of the preset area of the display panel includes:

counting all gray-scale values in the preset area, and counting the proportion of a single gray-scale value; if the proportion of a certain gray-scale value is greater than or equal to 30%, then using the gray-scale value as the area gray-scale value of the preset area; if there is no single gray-scale value whose proportion is greater than or equal to 30%, then counting the gray-scale values corresponding to all pixels in the preset area in each frame; summing and calculating an average value of all gray-scale values, and using the average value as the area gray-scale value of the preset area.

Optionally, the display panel includes a gray-scale determination unit and a timing control chip, and the gray-scale determination unit is connected to the timing control chip. The timing control chip includes a line counter, which judges the distance of the preset area to divide the display panel into the preset areas. The gray-scale determination unit is used for pre-reading the gray-scale values corresponding to all pixels in a frame of pictures in each preset area, and calculating the area gray-scale value.

Optionally, the operation of obtaining the optimal common voltage value corresponding to the area gray-scale value from the common voltage look-up table corresponding to the preset area, and outputting it to the common electrode of the preset area to drive the display panel for display includes:

according to the area gray-scale value, obtaining the optimal common voltage value corresponding to the area gray-scale value based on three reference area gray-scales and an interpolation algorithm;

The common voltage look-up table stores the three reference area gray-scales and three optimal common voltage values corresponding to the three reference gray-scales, and the interpolation algorithm adopts a mathematical logic interpolation method or a panel characteristic curve interpolation method.

Optionally, in the operation of obtaining the optimal common voltage value corresponding to the area gray-scale value from the common voltage look-up table corresponding to the preset area, and outputting it to the common electrode of the preset area to drive the display panel for display, outputting the optimal common voltage value to the common electrode of the preset area during a row idle time of the scan line to drive the display panel for display.

The present application further discloses a display device, including a display panel and a driving circuit, wherein the driving circuit drives the display panel by using a driving method including:

obtaining an area gray-scale value of a preset area of the display panel;

obtaining an optimal common voltage value corresponding to the area gray-scale value from a common voltage look-up table corresponding to the preset area, and outputting the optimal common voltage value to a common electrode of the preset area to drive the display panel for display;

wherein the common voltage look-up table is generated by a method including:

driving the preset area for display with a preset area gray-scale value;

shooting the preset area, and obtaining a flicker value corresponding to the preset area;

adjusting the common voltage value a plurality of times, and recording the common voltage value when the flicker value is the minimum as the optimal common voltage value;

adjusting the preset area gray-scale value a plurality of times, and recording a plurality of optimal common voltage values corresponding to the plurality of adjusted preset area gray-scale values; and generating the common voltage look-up table based on the plurality of preset area gray-scale values and the corresponding optimal common voltage values.

Compared with directly adjusting the common voltage value of the entire center area, the present application obtains the optimal common voltage value for the preset area gray-scale value, so that there is a suitable common voltage value corresponding to each gray-scale. In addition, different areas have different corresponding optimal common voltage values, and different areas and different gray-scales will output different optimal common voltage settings to dynamically change the optimal common voltages for different gray-scales in different locations, so that the panel can achieve uniform charging under various display images.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

Figure 1:
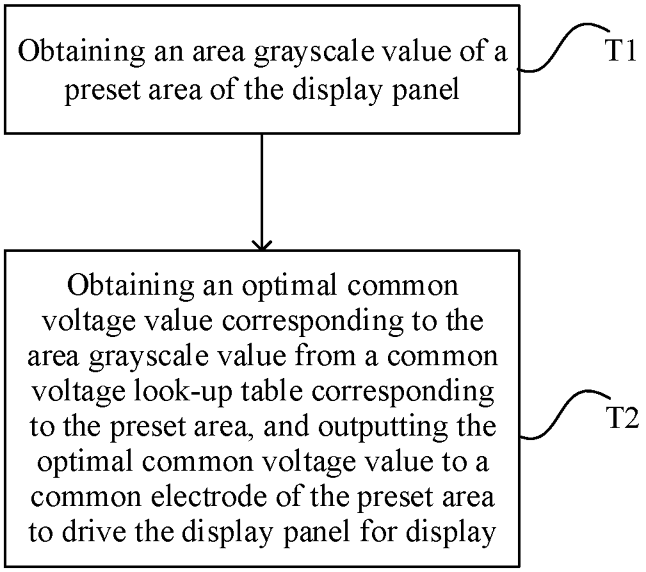
FIG. 1 is a schematic flowchart illustrating a driving method according to a first embodiment of the present application.

It should be understood that the terminology used herein, the specific structural and functional details disclosed are intended for the mere purpose of describing specific embodiments and are representative, but the present application may be embodied in many alternative forms and should not be construed as limited only the embodiments set forth herein.

In the description of this application, the terms "first" and "second" are merely used for description purposes, and cannot be understood as indicating relative importance, or implicitly indicating the number of indicated technical features. Thus, unless otherwise specified, features defined as "first" and "second" may expressly or implicitly include one or more of the features; "plurality" means two or more. The terms "including", "comprising", and any variations thereof are intended to mean a non-exclusive inclusion, namely one or more other features, integers, steps, operations, units, components and/or combinations thereof may be present or added.

In addition, terms such as "center", "transverse", "lateral", "above", "on", "under", "below", "left", "right", "vertical", "horizontal", "top", "bottom", "inside", "outside", etc., indicative of orientations or positional relationships are described based on the orientations or relative positional relationships illustrated in the drawings, and are intended for the mere purpose of convenience of simplified description of the present application, rather than indicating that the device or element referred to must have a specific orientation or be constructed, and operate in a particular orientation. Thus, these terms should not be construed as limiting the present application.

In addition, unless otherwise expressly specified and defined, terms "installed on", "connected to", and "coupled to" should be understood in a broad sense. For example, it may be a fixed connection, a detachable connection, or an integral connection; it may be a mechanical connection, or may also be an electrical connection; it may be a direct connection, an indirect connection through an intermediate medium, or an internal connection between two components. For those having ordinary skill in the art, the specific meanings of the above terms in this application can be understood depending on specific contexts.

The present application will be described in detail below with reference to the accompanying drawings and optional embodiments. It should be noted that, should no conflict be present, the embodiments or technical features described below can be arbitrarily combined to form new embodiments.

FIG. 1 is a schematic flowchart illustrating a driving method according to a first embodiment of the present application. As the first embodiment of the present application, a driving method is disclosed. A common voltage look-up table obtained by a method for generating a common voltage look-up table is used to drive a display panel. As illustrated in FIG. 1, the driving method includes the following operations:

T1: obtaining the area gray-scale value of a preset area of the display panel;

T2: obtaining the optimal common voltage value corresponding to the area gray-scale value from the common voltage look-up table corresponding to the preset area, and outputting it to the common electrode of the preset area to drive the display panel for display.

When driving the display panel to display, we first obtain the area gray-scale value corresponding to the preset area, find the optimal common voltage value from the corresponding common voltage look-up table according to the area gray-scale value of the preset area, and use the optimal common voltage value to drive the display panel, so as to avoid the problem that the original common voltage value is too large or too small resulting in a large screen flicker value and bringing a bad experience to customers.

Figure 2:
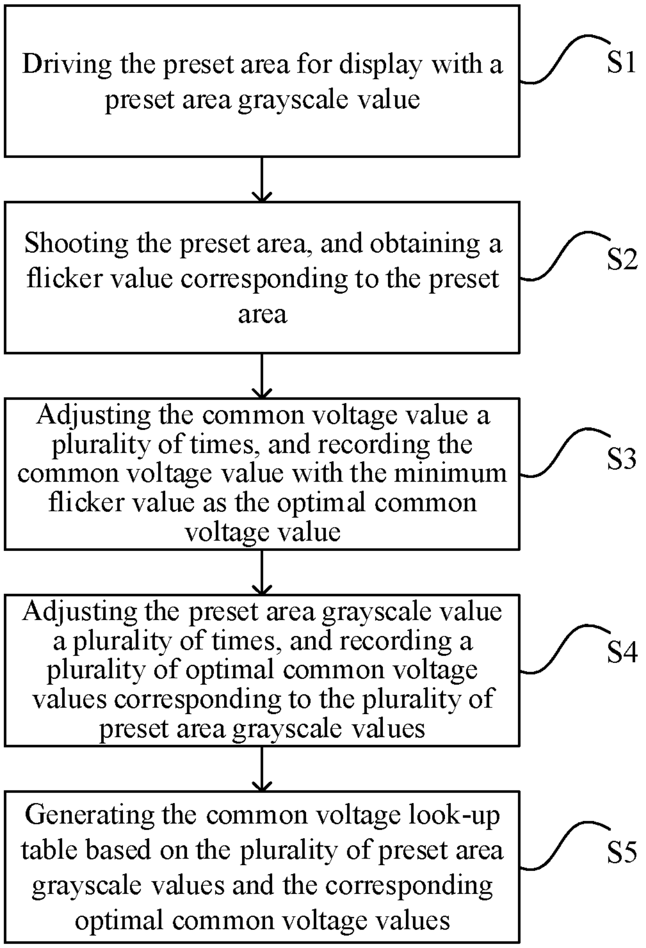
FIG. 2 is a schematic flowchart illustrating a method for generating a common voltage look-up table according to the first embodiment of the present application.

FIG. 2 is a schematic flowchart illustrating a method for generating a common voltage look-up table according to the first embodiment of the present application. As illustrated in FIG. 2, the method for generating the common voltage look-up table includes the following operations:

S1: driving the preset area for display with the preset area gray-scale value;

S2: shooting the preset area and obtaining the flicker value corresponding to the preset area;

S3: adjusting the common voltage value a number of times, and recording the common voltage value with the smallest flicker value as the optimal common voltage value;

S4: adjusting the preset area gray-scale value a number of times, and recording a plurality of optimal common voltage values corresponding to the plurality of adjusted preset area gray-scale values; and S5: generating the common voltage look-up table according to the plurality of preset area gray-scale values and corresponding optimal common voltage values.

In the preset area, the preset area is driven for display with the gray-scale value for the preset area, a camera (CCD camera) is used to capture the brightness of the preset area and obtain the flicker value (flicker), and then a computer (PC) is used to control and adjust the voltage setting of the common voltage (VCOM) online, and then the VCOM setting when the flicker value is the smallest is recorded. At this time, the VCOM is in the best setting state, and the VCOM value is the optimal common voltage value, so that different areas of the panel can be adjusted to the optimal under different display images, so that the full-screen display in all scenes is uniform and flicker-free.

Further, there are at least two preset areas, and each of the preset areas corresponds to a common voltage look-up table. The common voltage look-up table corresponding to at least one of the preset regions is different from the common voltage look-up tables corresponding to other preset areas. At least one same preset gray-scale value in different common voltage look-up tables correspond to different optimal common voltage values.

Because there may be some differences in the position of each preset area, the image to be displayed, and the corresponding gray-scale value, we can generate a common voltage look-up table based on each preset area. Some preset areas may have identical gray-scales or images, and can share a common voltage look-up table, that is, some common voltage look-up tables may be identical. Some common voltage look-up tables are also different. The gray-scale values and the optimal common values in different common voltage look-up tables may be different. Alternatively, the optimal common voltage values corresponding to a certain gray-scale value in different common voltage look-up tables corresponding to different regions may be different.

Figure 3:
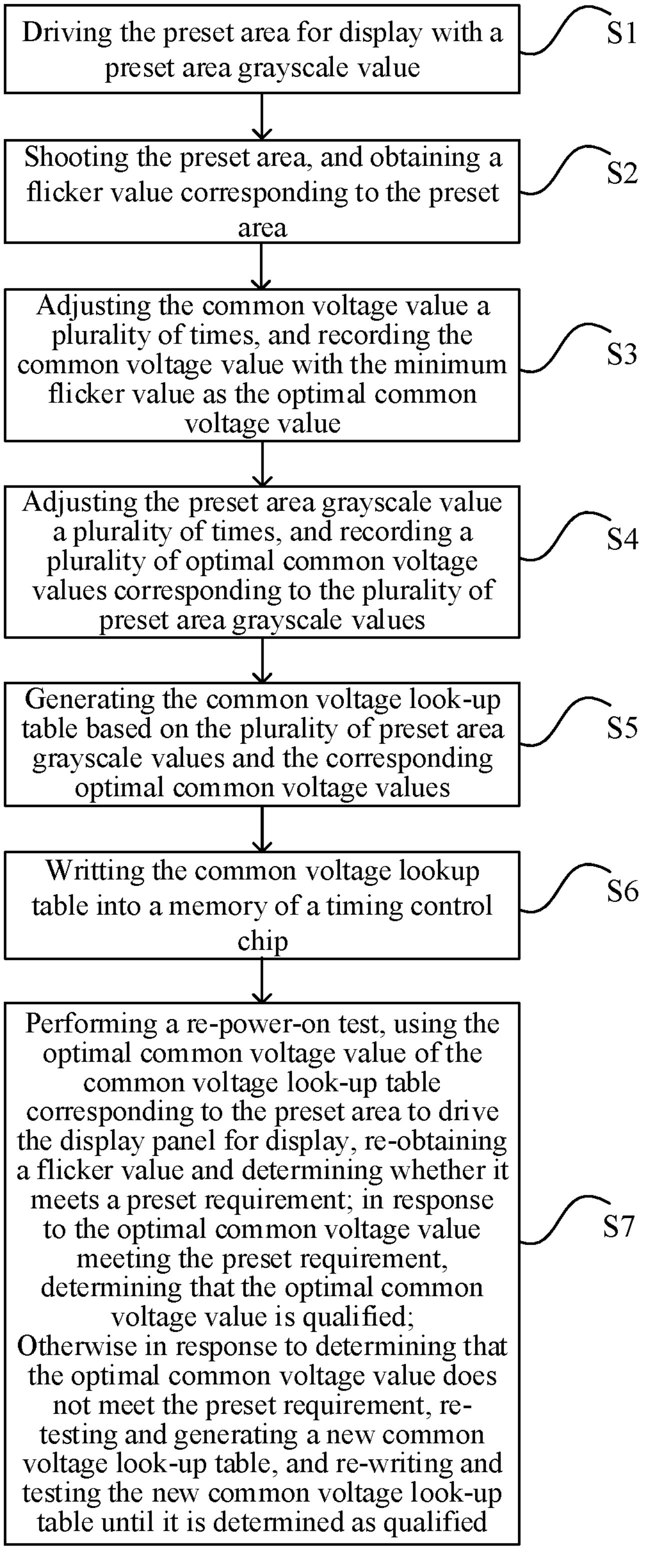
FIG. 3 is a schematic flowchart illustrating a detection method of the common voltage look-up table according to the second embodiment of the present application.

FIG. 3 is a schematic flowchart illustrating a detection method of the common voltage look-up table according to the second embodiment of the present application. This embodiment is a further improvement and refinement of the first embodiment. After obtaining the common voltage look-up table, the method may further include the operations of writing and testing. Specifically, the method may further include the following operations subsequent to the operation of generating the common voltage look-up table according to the gray-scale values of the multiple preset areas and the corresponding optimal common voltage values:

S6: writing the common voltage look-up table into a memory of the timing control chip;

S7: performing a re-power-on test, using the optimal common voltage values of the common voltage look-up table corresponding to the preset area to drive the display panel for display, re-obtaining the flicker values and determine whether they meets the preset requirements; if they meet the preset requirements, deciding that the common voltage look-up table is qualified; otherwise if they don't meet the preset requirements, re-testing and generating a new common voltage look-up table, and writing the new common voltage look-up table and re-testing it until it is qualified.

That is, retesting after writing to determine the accuracy of the written optimal common voltage value; if the test indicates there is a problem, re-adjusting to obtain the optimal common voltage value again, and writing the new common voltage value into the memory of the timing control chip, where the new optimal common voltage value will overwrite the previous optimal common voltage value. The preset requirement is mainly to re-obtain the flicker value after applying the optimal common voltage value obtained from the look-up table, and if the difference is equal to the preset value, then the optimal common voltage value of the common voltage look-up table is written into the memory of the timing control chip; if the difference is not equal to the preset value, re-adjust the common voltage value, record the optimal common voltage value when the flicker value is the minimum and calculate the difference between the newly obtained flicker value and the minimum flicker value. In addition, the powered-on test can be performed before the writing operation and the order of the operations of writing and testing can be changed.

Further, the operation of obtaining the area gray-scale value the preset area of the display panel includes:

counting all gray-scale values in the preset area, and counting the proportion of a single gray-scale value; if the proportion of a certain gray-scale value is greater than or equal to 30%, then using the gray-scale value as the area gray-scale value of the preset area; if there is no single gray-scale value whose proportion is greater than or equal to 30%, then counting the gray-scale values corresponding to all pixels in the preset area in each frame; summing and calculating an average value of all gray-scale values, and using the average value as the area gray-scale value of the preset area.

In the operation of obtaining the optimal common voltage value corresponding to the area gray-scale value from the common voltage look-up table corresponding to the preset area, and outputting it to the common electrode of the preset area to drive the display panel for display, outputting the optimal common voltage value to the common electrode of the preset area during a row idle time of the scan line to drive the display panel for display.

The operation of obtaining the area gray-scale value of the preset area of the display panel further includes:

counting all the gray-scale values in the preset area, arranging all the gray-scale values in order, taking the middle gray-scale as the area gray-scale value, selecting the corresponding optimal common voltage value from the look-up table and inputting it to the preset area for driving and displaying.

In the above method for selecting gray-scale values in a region, it is possible to take the average of all gray-scale values, the median, or the mode. The time for selecting and inputting the optimal common voltage value, in addition to the above row idle time, can also choose the blank time before each frame, or it can be the same time as the turn-on time of the first row of scan line, or it can be the turn-on time of a middle row of scan line or the turn-on of the last row of scan line. The corresponding time to input the optimal common voltage value can be selected depending on the display effect.

Generally, the preset areas can be divided depending on the effect of the display area of the panel, or the preset areas can be divided depending on the distances from the far and near ends of the drive chip. The number of preset areas can be at least two. In this embodiment, the display area is equally divided into 9 preset areas in the manner of three horizontal rows times three vertical columns. The operation of the area gray-scale value of the preset area of the display panel includes:

obtaining the area gray-scale value of each of the 9 preset areas;

The operation of obtaining the common voltage value corresponding to the area gray-scale value from the common voltage look-up table corresponding to the preset area and outputting it to the common electrode of the preset area to drive the display panel for display includes:

obtaining the optimal common voltage values corresponding to the area gray-scale values in the 9 preset areas from the common voltage look-up tables corresponding to the 9 preset areas, respectively, and outputting them to the common electrodes of the 9 preset areas to drive the 9 preset areas of the display panel for display.

During normal operation, the timing control chip (TCON IC) will detect the line counter X, so that it can know the current driving position, and synchronously judge the gray-scale according to the input display data, that is, to know the current display area and the display image of this area. Then it can control the output of different optimal common voltage values, and then transmit them to the gamma chip or common voltage chip through the transmission interface I2C protocol, and then output them after the internal digital to analog module.

Among the 9 preset areas, the preset areas at both ends can share a common voltage look-up table, and the optimal common voltage value corresponding to the area gray-scale value can be searched according to the same common voltage look-up table and input to the preset areas at both ends at the same time.

Figure 4:
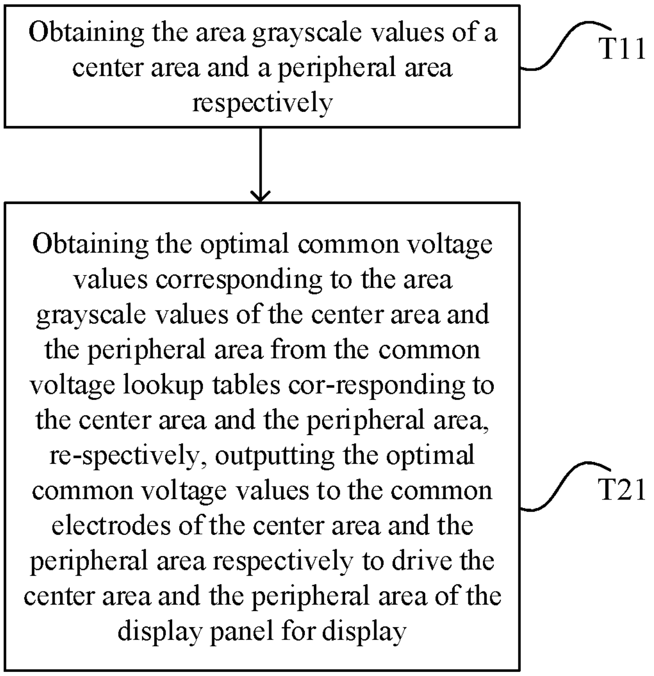
FIG. 4 is a schematic flowchart illustrating a driving method according to a third embodiment of the present application.

FIG. 4 is a schematic flowchart illustrating a driving method according to a third embodiment of the present application. This embodiment is a refinement and perfection of the first embodiment, and the preset areas include a center area and a peripheral area. As illustrated in FIG. 4, the operation of obtaining the area gray-scale value of the preset area of the display panel includes:

T11: obtaining the area gray-scale values of the center area and the peripheral area respectively;

The operation of obtaining the common voltage value corresponding to the area gray-scale value from the common voltage look-up table corresponding to the preset area and outputting it to the common electrode of the preset area to drive the display panel for display includes:

T21: obtaining the optimal common voltage values corresponding to the gray-scale values of the center area and the peripheral area respectively from the common voltage look-up tables corresponding to the center area and the peripheral area, and outputting the obtained optimal common voltages to the common electrodes of the center area and the peripheral area respectively to drive the middle area and the peripheral area of the display panel for display;

wherein the peripheral area is arranged around the center area, and the area ratio of the center area to the peripheral area is 2:1 to 1:1.

The common voltage look-up table corresponding to the center area is a first common voltage look-up table, and the common voltage look-up table corresponding to the peripheral area is a second common voltage look-up table. A set of a preset gray-scale value and an optimal common voltage value in the common voltage look-up table constitute a data group, and the number of data groups in the first common voltage look-up table is greater than the number of data groups in the second common voltage look-up table.

In particular, the display panel includes a gray-scale determination unit and a timing control chip, and the gray-scale determination unit is connected to the timing control chip. The gray-scale determination unit is used for pre-reading the gray-scale values corresponding to all pixels in a frame of pictures in each preset area, and calculating the area gray-scale value.

The operation of obtaining the optimal common voltage value corresponding to the area gray-scale value from the common voltage look-up table corresponding to the preset area, and outputting it to the common electrode of the preset area to drive the display panel for display includes:

according to the area gray-scale value, obtaining the optimal common voltage value corresponding to the area gray-scale value based on three reference area gray-scales and an interpolation algorithm;

The common voltage look-up table stores the three reference area gray-scales and three optimal common voltage values corresponding to the three reference gray-scales, and the interpolation algorithm adopts a mathematical logic interpolation method or a panel characteristic curve interpolation method.

For example, 3 sets of reference area gray-scales may be stored, corresponding to 10 gray-scales, 127 gray-scales, and 240 gray-scales, respectively. Other gray-scale values are obtained according to the interpolation algorithm. The interpolation algorithm can be a mathematical logic interpolation, or an interpolation according to the panel characteristic curve, so that the optimal common voltage values corresponding to all gray-scales between 10 and 240 can be obtained in real time from the three sets of gray-scales. The timing control chip may judge the area according to the line counter X, and then judge the input gray-scales in the area according to the input data. It can comprehensively consider all the display data in the area, or only judge the gray-scale at the center point in the area, and then find and output the corresponding optimal common voltage value.

Figure 5:
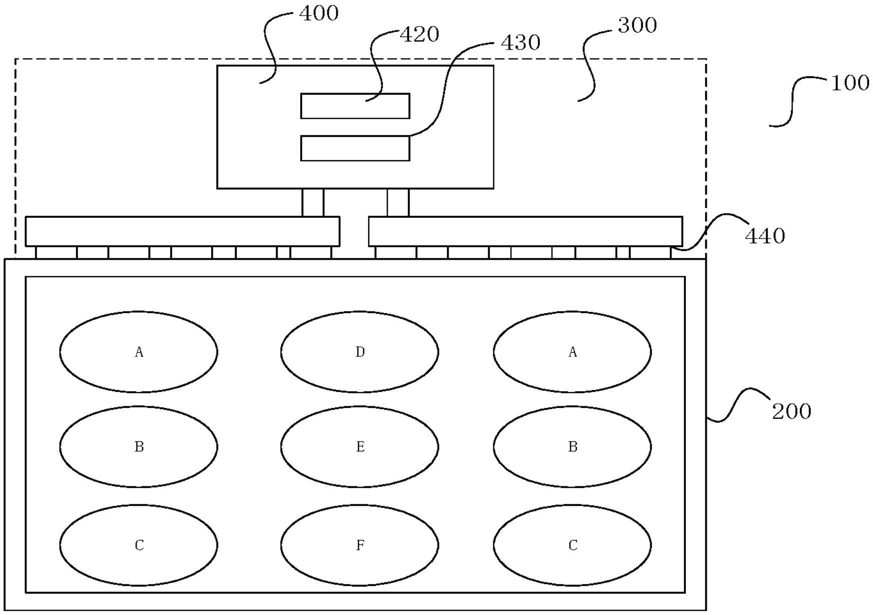
FIG. 5 is a schematic diagram illustrating a display device according to a fourth embodiment of the present application.
Figure 6:
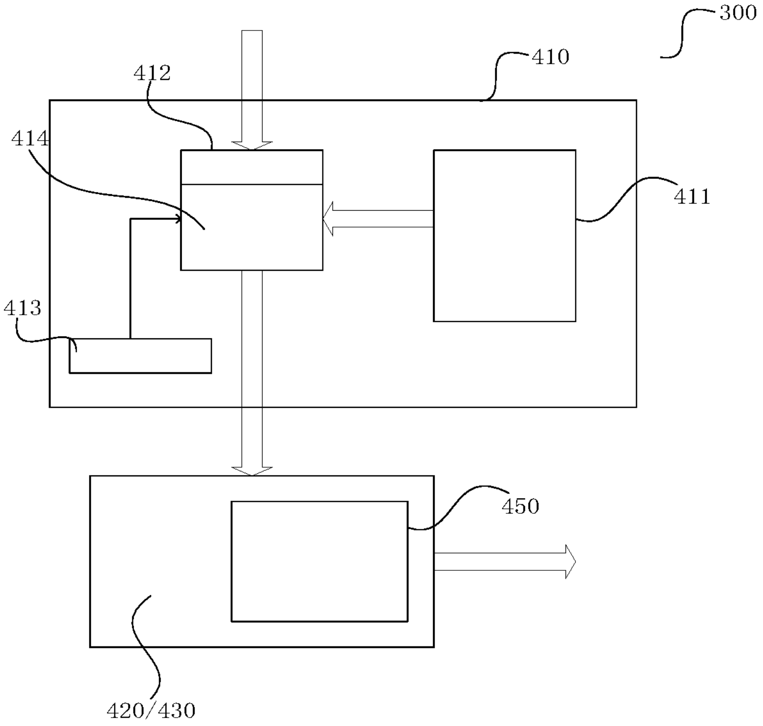
FIG. 6 is a schematic diagram illustrating a driving circuit of a display device according to the fourth embodiment of the present application.

FIG. 5 is a schematic diagram of a display device according to a fourth embodiment of the present application. FIG. 6 is a schematic diagram of a driving circuit of a display device according to the fourth embodiment of the present application. As the fourth embodiment of the present application, a display device is disclosed, which can be driven by using the driving method disclosed in any of the above embodiments. Specifically, as illustrated in FIG. 5, the display device 100 includes a display panel 200 and a driving circuit 300, and the driving circuit uses the driving method described in any of the above embodiments to drive the display panel.

The driving circuit 300 includes a drive board 400. A common voltage chip 420 is added to the driver board 400 (PCBA) as a power supply chip for the optimal common voltage in a preset area, and the original gamma chip 430 is used as a power supply chip for the optimal common voltage in a preset area. The display panel further includes a data driving chip 440. The preset areas are divided depending on the distances from the far and near ends of the data-driven chip. The preset areas at the far and near ends can be the same preset area or different preset areas. The areas corresponding to ABCDEF in FIG. 5 are different preset areas.

Further, as illustrated in FIG. 6, on the power supply chip, the common voltage chip 420 or the gamma chip 430 is provided with a digital-to-analog module 450, and the driving circuit 300 includes a timing control chip 410, and the timing control chip includes a line counter 413, a memory 411, a gray-scale determination unit 412 and a control unit 414. A storage module is added inside the timing control chip (TCON IC), and the MCU (control unit) is used to detect the line counter X to judge the distance, and at the same time to judge the input gray-scale. Then, different VCOM settings will be output corresponding to different regions and different gray-scales of the far and near ends to dynamically change the VCOM voltages of different gray-scales at different positions, and then transmitted to the gamma chip or common voltage chip through the transmission interface I2C protocol. Then these settings can be output after going through the internal digital to analog module, so that the panel can achieve uniform charging under various display images.

It should be noted that the description of various steps involved in this solution are not to be construed as limiting the order of steps, if the implementation of the specific solution is not affected. That is, the steps written in earlier can be performed before, or after, or even at the same time as those written later. As long as this solution can be implemented, any order of the steps should be regarded as falling the scope of protection of this application.

The technical solutions of the present application may be widely used in various display panels, such as TN (Twisted Nematic) display panels, IPS (In-Plane Switching) display panels, VA (Vertical Alignment) display panels, and MVA (Multi-Domain Vertical Alignment) display panels. Of course, the above solutions are also applicable to other types of display panels, such as OLED (Organic Light-Emitting Diode) display panels.

It should be noted that the inventive concept of the present application can form a large number of embodiments, but they cannot be enumerated because the length of the application document is limited. The technical features as set forth herein can be arbitrarily combined to form a new embodiment, and the original technical effects may be enhanced after various embodiments or technical features are combined.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A driving method for driving a display panel according to a common voltage look-up table, the driving method comprising:

obtaining an area gray-scale value of a preset area of the display panel;

obtaining an optimal common voltage value corresponding to the area gray-scale value from a common voltage look-up table corresponding to the preset area, and outputting the optimal common voltage value to a common electrode of the preset area to drive the display panel for display;

wherein the common voltage look-up table is generated by a method comprising:

driving the preset area for display with a preset area gray-scale value;

shooting the preset area, and obtaining a flicker value corresponding to the preset area;

adjusting the common voltage value a plurality of times, and recording the common voltage value when the flicker value is the minimum as the optimal common voltage value;

adjusting the preset area gray-scale value a plurality of times, and recording a plurality of optimal common voltage values corresponding to the plurality of adjusted preset area gray-scale values;

generating the common voltage look-up table based on the plurality of preset area gray-scale values and the corresponding optimal common voltage values;

wherein the operation of obtaining the area gray-scale value of the preset area of the display panel comprises:

counting all gray-scale values in the preset area, and counting a proportion of each single gray-scale value; when the proportion of a certain gray-scale value is greater than or equal to 30%, using this gray-scale value as the area gray-scale value of the preset area; when there is no single gray-scale value whose proportion is greater than or equal to 30%, counting the gray-scale values corresponding to all pixels in the preset area in each frame; summing and calculating an average value of all the gray-scale values, and using an average value of all the gray-scale values as the area gray-scale value of the preset area;

wherein the driving method further comprises the following operations subsequent to the operation of generating the common voltage look-up table according to the plurality of preset area gray-scale values and the corresponding optimal common voltage values:

writing the common voltage look-up table into a memory of a timing control chip;

performing a re-power-on test, using the optimal common voltage value of the common voltage look-up table corresponding to the preset area to drive the display panel for display, re-obtaining a flicker value and determining whether the flicker value meets a preset requirement; in response to determining that the optimal common voltage value meets the preset requirement, deciding that the optimal common voltage value is qualified; otherwise in response to determining that the optimal common voltage value does not meet the preset requirement, re-testing and generating a new common voltage look-up table, and rewriting and testing the new common voltage look-up table until it is decided as qualified.

2. The driving method of claim 1, wherein there are at least two preset areas, each of which corresponding to a respective common voltage look-up table; the common voltage look-up table corresponding to at least one of the at least two preset areas is different from the common voltage look-up tables corresponding to other preset areas;

wherein at least one same preset gray-scale value in different common voltage look-up tables corresponds to different optimal common voltage values.

3. The driving method of claim 1, wherein the display panel is equally divided into nine preset areas;

wherein the operation of obtaining the area gray-scale value of the preset area of the display panel comprises:

obtaining the respective area gray-scale values of the nine preset areas;

wherein the operation of obtaining the optimal common voltage value corresponding to the area gray-scale value from the common voltage look-up table corresponding to the preset area and outputting the common voltage value to the common electrode of the preset area to drive the display panel for display comprises:

obtaining the optimal common voltage values corresponding to the area gray-scale values in the nine preset areas from the common voltage look-up tables corresponding to the nine preset areas, respectively, and outputting the optimal common voltage values to the common electrodes of the nine preset areas to drive the nine preset areas of the display panel for display.

4. The driving method of claim 1, wherein in the operation of obtaining the optimal common voltage value corresponding to the area gray-scale value from the common voltage look-up table corresponding to the preset area, and outputting the optimal common voltage value to the common electrode of the preset area to drive the display panel for display, the optimal common voltage value is output to the common electrode of the preset area during a row idle time of the scan line to drive the display panel for display.

5. A driving method for driving a display panel according to a common voltage look-up table, the driving method comprising:

obtaining an area gray-scale value of a preset area of the display panel;

obtaining an optimal common voltage value corresponding to the area gray-scale value from a common voltage look-up table corresponding to the preset area, and outputting the optimal common voltage value to a common electrode of the preset area to drive the display panel for display;

wherein the common voltage look-up table is generated by a method comprising:

driving the preset area for display with a preset area gray-scale value;

shooting the preset area, and obtaining a flicker value corresponding to the preset area;

adjusting the common voltage value a plurality of times, and recording the common voltage value when the flicker value is the minimum as the optimal common voltage value;

adjusting the preset area gray-scale value a plurality of times, and recording a plurality of optimal common voltage values corresponding to the plurality of adjusted preset area gray-scale values;

generating the common voltage look-up table based on the plurality of preset area gray-scale values and the corresponding optimal common voltage values;

wherein the display panel comprises a gray-scale determination unit and a timing control chip, wherein the gray-scale determination unit is connected to the timing control chip; wherein the timing control chip comprises a line counter configured to judge a distance of the preset area to divide the display panel into the preset areas; wherein the gray-scale determination unit is configured for pre-reading the gray-scale values corresponding to all pixels in a frame of image in each preset area, and calculating the area gray-scale value;

wherein the driving method further comprises the following operations subsequent to the operation of generating the common voltage look-up table according to the plurality of preset area gray-scale values and the corresponding optimal common voltage values:

writing the common voltage look-up table into a memory of a timing control chip;

performing a re-power-on test, using the optimal common voltage value of the common voltage look-up table corresponding to the preset area to drive the display panel for display, re-obtaining a flicker value and determining whether the flicker value meets a preset requirement; in response to determining that the optimal common voltage value meets the preset requirement, deciding that the optimal common voltage value is qualified; otherwise in response to determining that the optimal common voltage value does not meet the preset requirement, re-testing and generating a new common voltage look-up table, and rewriting and testing the new common voltage look-up table until it is decided as qualified.

6. The driving method of claim 5, wherein there are at least two preset areas, each of which corresponding to a respective common voltage look-up table; the common voltage look-up table corresponding to at least one of the at least two preset areas is different from the common voltage look-up tables corresponding to other preset areas;

wherein at least one same preset gray-scale value in different common voltage look-up tables corresponds to different optimal common voltage values.

7. The driving method of claim 5, wherein the display panel is equally divided into nine preset areas;

wherein the operation of obtaining the area gray-scale value of the preset area of the display panel comprises:

obtaining the respective area gray-scale values of the nine preset areas;

wherein the operation of obtaining the optimal common voltage value corresponding to the area gray-scale value from the common voltage look-up table corresponding to the preset area and outputting the common voltage value to the common electrode of the preset area to drive the display panel for display comprises:

obtaining the optimal common voltage values corresponding to the area gray-scale values in the nine preset areas from the common voltage look-up tables corresponding to the nine preset areas, respectively, and outputting the optimal common voltage values to the common electrodes of the nine preset areas to drive the nine preset areas of the display panel for display.

8. The driving method of claim 5, wherein in the operation of obtaining the optimal common voltage value corresponding to the area gray-scale value from the common voltage look-up table corresponding to the preset area, and outputting the optimal common voltage value to the common electrode of the preset area to drive the display panel for display, the optimal common voltage value is output to the common electrode of the preset area during a row idle time of the scan line to drive the display panel for display.

9. A driving method for driving a display panel according to a common voltage look-up table, the driving method comprising:

obtaining an area gray-scale value of a preset area of the display panel;

obtaining an optimal common voltage value corresponding to the area gray-scale value from a common voltage look-up table corresponding to the preset area, and outputting the optimal common voltage value to a common electrode of the preset area to drive the display panel for display;

wherein the common voltage look-up table is generated by a method comprising:

driving the preset area for display with a preset area gray-scale value;

shooting the preset area, and obtaining a flicker value corresponding to the preset area;

adjusting the common voltage value a plurality of times, and recording the common voltage value when the flicker value is the minimum as the optimal common voltage value;

adjusting the preset area gray-scale value a plurality of times, and recording a plurality of optimal common voltage values corresponding to the plurality of adjusted preset area gray-scale values;

generating the common voltage look-up table based on the plurality of preset area gray-scale values and the corresponding optimal common voltage values;

wherein the operation of obtaining the optimal common voltage value corresponding to the area gray-scale value from the common voltage look-up table corresponding to the preset area, and outputting the optimal common voltage value to the common electrode of the preset area to drive the display panel for display comprises:

obtaining the optimal common voltage value corresponding to the area gray-scale value based on three reference area gray-scales and an interpolation algorithm;

wherein the three reference area gray-scales and three optimal common voltage values corresponding to the three reference gray-scales are stored in the common voltage look-up table, and wherein the interpolation algorithm is implemented as a mathematical logic interpolation method or a panel characteristic curve interpolation method;

wherein the driving method further comprises the following operations subsequent to the operation of generating the common voltage look-up table according to the plurality of preset area gray-scale values and the corresponding optimal common voltage values:

writing the common voltage look-up table into a memory of a timing control chip;

performing a re-power-on test, using the optimal common voltage value of the common voltage look-up table corresponding to the preset area to drive the display panel for display, re-obtaining a flicker value and determining whether the flicker value meets a preset requirement; in response to determining that the optimal common voltage value meets the preset requirement, deciding that the optimal common voltage value is qualified; otherwise in response to determining that the optimal common voltage value does not meet the preset requirement, re-testing and generating a new common voltage look-up table, and rewriting and testing the new common voltage look-up table until it is decided as qualified.

10. The driving method of claim 9, wherein there are at least two preset areas, each of which corresponding to a respective common voltage look-up table; the common voltage look-up table corresponding to at least one of the at least two preset areas is different from the common voltage look-up tables corresponding to other preset areas;

wherein at least one same preset gray-scale value in different common voltage look-up tables corresponds to different optimal common voltage values.

11. The driving method of claim 9, wherein the display panel is equally divided into nine preset areas;

wherein the operation of obtaining the area gray-scale value of the preset area of the display panel comprises:

obtaining the respective area gray-scale values of the nine preset areas;

wherein the operation of obtaining the optimal common voltage value corresponding to the area gray-scale value from the common voltage look-up table corresponding to the preset area and outputting the common voltage value to the common electrode of the preset area to drive the display panel for display comprises:

obtaining the optimal common voltage values corresponding to the area gray-scale values in the nine preset areas from the common voltage look-up tables corresponding to the nine preset areas, respectively, and outputting the optimal common voltage values to the common electrodes of the nine preset areas to drive the nine preset areas of the display panel for display.

12. The driving method of claim 9, wherein in the operation of obtaining the optimal common voltage value corresponding to the area gray-scale value from the common voltage look-up table corresponding to the preset area, and outputting the optimal common voltage value to the common electrode of the preset area to drive the display panel for display, the optimal common voltage value is output to the common electrode of the preset area during a row idle time of the scan line to drive the display panel for display.

* * * * *